(12) United States Patent
Boeck

(10) Patent No.: US 9,822,797 B2
(45) Date of Patent: Nov. 21, 2017

(54) TURBOMACHINE

(71) Applicant: MTU Aero Engines AG, Munich (DE)

(72) Inventor: Alexander Boeck, Kottgeisering (DE)

(73) Assignee: MTU AERO ENGINES AG, Munich (DE)

( * ) Notice: Subject to any disclaimer, the term of this patent is extended or adjusted under 35 U.S.C. 154(b) by 419 days.

(21) Appl. No.: 14/467,361

(22) Filed: Aug. 25, 2014

(65) Prior Publication Data

US 2015/0063983 A1  Mar. 5, 2015

(30) Foreign Application Priority Data

Sep. 3, 2013 (DE) .................. 10 2013 217 504

(51) Int. Cl.
F04D 29/58 (2006.01)
F01D 25/12 (2006.01)
F02C 9/18 (2006.01)
F01D 5/08 (2006.01)
F01D 9/02 (2006.01)
F04D 29/54 (2006.01)

(52) U.S. Cl.
CPC ......... *F04D 29/5826* (2013.01); *F01D 5/081* (2013.01); *F01D 9/02* (2013.01); *F01D 25/12* (2013.01); *F02C 9/18* (2013.01); *F04D 29/542* (2013.01); *F04D 29/584* (2013.01); *F05D 2220/3219* (2013.01); *Y02T 50/676* (2013.01)

(58) Field of Classification Search
CPC .............................................. F05D 2220/3219
See application file for complete search history.

(56) References Cited

U.S. PATENT DOCUMENTS

| 3,614,257 | A | * | 10/1971 | Campbell | ................. F02C 7/18 |
| | | | | | 415/106 |
| 4,719,747 | A | * | 1/1988 | Willkop | .................. F01D 5/066 |
| | | | | | 415/115 |
| 4,920,741 | A | * | 5/1990 | Liebl | ......................... F02C 7/18 |
| | | | | | 415/115 |
| 2012/0045313 | A1 | * | 2/2012 | Rued | ....................... F01D 11/04 |
| | | | | | 415/116 |

FOREIGN PATENT DOCUMENTS

| DE | 2035423 A1 | 2/1971 |
| DE | 2947439 A1 | 8/1980 |
| DE | 602004000527 T2 | 4/2007 |
| DE | 102009021384 | 11/2010 |
| EP | 0235642 A2 | 9/1987 |
| EP | 1045114 A3 | 10/2000 |
| EP | 2256294 A1 | 12/2010 |
| EP | 2447543 A1 | 5/2012 |
| GB | 2018362 A | 10/1979 |

\* cited by examiner

*Primary Examiner* — Gregory Anderson
*Assistant Examiner* — Jason Davis
(74) *Attorney, Agent, or Firm* — Barlow, Josephs & Holmes, Ltd.

(57) ABSTRACT

A turbomachine having a cooling device for supplying cooling air onto a compressor region from an air distribution chamber is disclosed, the air distribution chamber being arranged between an outlet diffuser of a compressor and a combustion chamber, where the cooling device has cooling air pipes for supplying cooling air from the air distribution chamber into a cavity between the outlet diffuser and a rotor segment of the compressor.

18 Claims, 1 Drawing Sheet

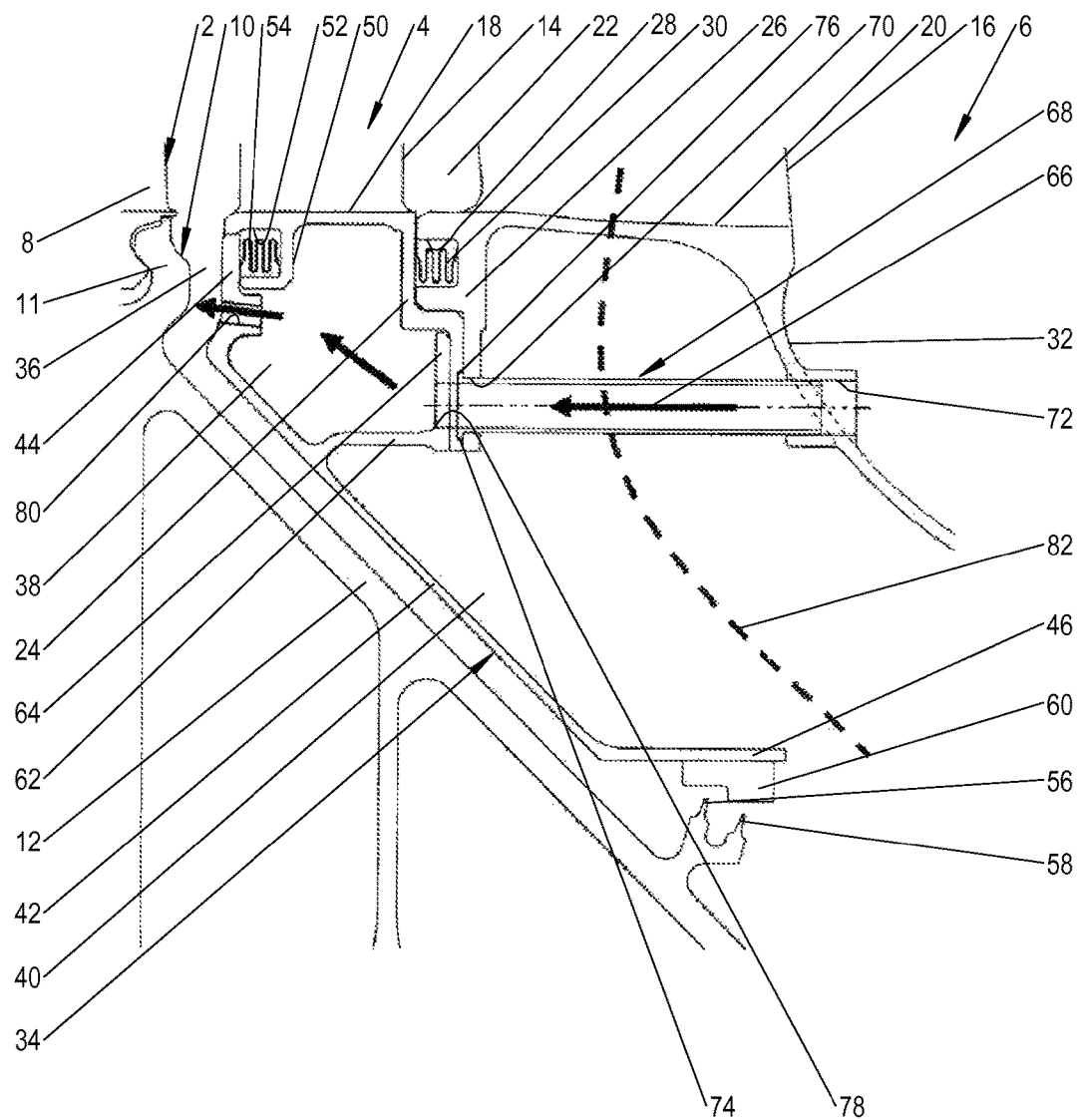

TURBOMACHINE

BACKGROUND OF THE INVENTION

The invention relates to a turbomachine, as described and shown below.

In order to diminish structural component temperatures in the region of the final compressor stage and also a rotor shaft segment adjoining the compressor stage, cooling air is preferably blown in from an air distribution chamber between an outlet diffuser of the compressor and an associated combustion chamber, instead of using cooling air from the boundary layers in the flow conduit of the compressor in the region of the inner shrouds. The supply of cooling air into a cavity from the region in front of the combustion chamber occurs conventionally through a plurality of successively arranged intervening chambers of the outlet diffuser, which are in fluid connection with one another. The drawback of this cooling air supply, however, is that, owing to the plurality of intervening chambers, the cooling air undergoes a significant loss of pressure. If, in addition, radial supply lines, such as air bleed or oil lines traverse an intervening chamber, the pressure loss to which the cooling air is subject is augmented. In addition, leakage can occur in the region of inlet and outlet points of the supply lines due to the intervening chambers.

SUMMARY OF THE INVENTION

The object of the invention is to create a turbomachine with a cooling device for supplying cooling air from an air distribution chamber between an outlet diffuser of a compressor and at least one combustion chamber onto a compressor region, said turbomachine eliminating the mentioned drawbacks and enabling a higher total pressure ratio for identical structural component temperatures.

This object is achieved by the turbomachine of the present invention.

A turbomachine according to the invention has a cooling device for supplying cooling air from an air distribution chamber between an outlet diffuser of a compressor and at least one combustion chamber onto a compressor region, wherein the cooling device has cooling air pipes for conveying the cooling air from the air distribution chamber into a cavity between the outlet diffuser and a rotor segment of the compressor.

A targeted conveyance of the cooling air occurs through the cooling air pipes from the air distribution chamber in front of the combustion chamber in the direction of the compressor region that is to be cooled, as a result of which a high cooling air pressure is maintained. This makes it possible to adjust a higher overall pressure ratio for identical structural component temperatures. In this way, the efficiency of the turbomachine can be increased. Preferably, the cooling air pipes run in the axial direction of the turbomachine. In particular, the invention is suitable, for example, for the supply of cooling air in turbomachines to the final compressor stage, in which, for example, a bearing box of the high-pressure rotor is arranged below or radially inward with respect to the at least one combustion chamber.

If radial supply lines, such as air bleed, oil lines, and the like, are provided in the region of the outlet diffuser, it is advantageous for the avoidance of mutual damage to supply lines and the cooling air pipes if the supply lines and the cooling air pipes are spaced apart from one another as viewed in the peripheral direction of the turbomachine.

The position of the cooling air pipes in the peripheral direction can be defined precisely and the assembly of cooling air pipes can be simple in design when they are or will be inserted into bores in the outlet diffuser. In addition, this type of positioning makes it possible to adjust fits between the cooling air pipes and the bores in such a manner that leakage into the bore regions can be prevented.

For axial securing of the cooling air pipes, it is advantageous when they are arranged with a collar in a recess between two radial walls of adjacent diffuser vane rows. In this way, the cooling air pipes are automatically secured in position in the axial direction during assembly of the outlet diffuser.

For uniform cooling of the compressor region, it is advantageous when the cooling air pipes have an identical inner diameter and are distributed uniformly along the periphery of the outlet diffuser. The uniform cooling of the compressor region in the peripheral direction prevents thermal stresses in adjacent structural component regions due to different temperatures of the regions.

In one exemplary embodiment, the cooling air pipes open into a hollow chamber delimited radially outward by the outlet diffuser, said hollow chamber being open to the cavity via outlet openings. The supply of cooling air through the hollow chamber automatically results in a rear cooling of the outlet diffuser in this region.

Preferably, the outlet openings in the peripheral direction of the turbomachine are arranged at an angle. In this way, a twisting effect is achieved.

Additionally or alternatively, the outlet openings can form a constriction for the cooling air. Constriction means that the outlet openings have the smallest flow cross section or inner cross section as viewed over the entire cooling air path. In this way, an accelerated flow of cooling air at low relative speed to the rotor is achieved, which, in this case, effects an additional cooling. The pressure effectively drops at the outlet openings.

The hollow chamber can be delimited radially inward by a sealing ring mounted on the outlet diffuser. In this way, not only does the cooling of the outlet diffuser occur region by region, but also rear cooling of the sealing ring occurs region by region.

Other advantageous exemplary embodiments of the invention are set forth below.

BRIEF DESCRIPTION OF THE DRAWING FIGURE

A preferred exemplary embodiment of the invention will be described in detail below on the basis of the accompanying drawing figure in which:

FIG. 1 shows a schematic illustration of a longitudinal section through a turbomachine in the region of an outlet diffuser arranged downstream of a compressor.

DETAILED DESCRIPTION OF THE INVENTION

According to the longitudinal section in FIG. 1, an exemplary embodiment of a turbomachine according to the invention has a compressor 2, an outlet diffuser 4, and an air distribution chamber 6. The turbomachine 1 is, for example, a stationary gas turbine and, in particular, an aircraft engine. The outlet diffuser 4 is arranged between the compressor 2 and the air distribution chamber 6, as viewed in the flow direction of the main stream of air flowing through the turbomachine 1 essentially in the axial direction. The outlet diffuser 4 is thus directly downstream of the compressor 2. The air distribution chamber 6 is directly upstream of at least one combustion chamber of the combustion region and serves, in particular, for uniform distribution of the compressed main stream of air exiting the outlet diffuser 4 in the peripheral direction.

For reasons of clarity, only one row 8 of rotating blades of the compressor 2 is indicated and, as viewed in the flow direction, it is the last row of rotating blades of the compressor 2 in this case. The row of rotating blades 8 forms a part of a rotor and is arranged on a rotor shaft 10, which has an annular segment 11 with a peripheral groove for insertion of the rotating blades so as to seat the row 8 of rotating blades. In addition, the rotor shaft 10 has a conically tapered rotor segment 12 adjoining the annular segment 11 and, according to the illustration, extending below the outlet diffuser 4.

In the exemplary embodiment shown, the outlet diffuser 4 has two rows of guide vanes or diffuser vane rows 14, 16, each of which has an inner shroud ring 18, 20 that delimits radially inward an annular main stream conduit 22 through which the main stream of air flows.

The guide vane rows 14, 16 are in contact with each other in the axial direction of the turbomachine and, to this end, each of them has a radial wall 24, 26, which extends radially inward from the inner shroud rings 18, 20. In order to prevent any main stream intake from the main stream conduit 22 passing through between the radial walls 24, 26, a seal 30, such as, for example, a W-shaped sheet metal seal, is inserted in a sealing chamber 28 of the radial wall 26 of the back guide vane row 16.

The back guide vane row 16 additionally has a back curved wall 32, which extends radially inward from the inner shroud ring 20 and delimits the air distribution chamber 6 upstream in the axial direction.

Furthermore, the turbomachine 1 has a sealing ring 34, which is arranged radially inward with respect to the outlet diffuser 4 and delimits a cavity 36 relative to the rotor shaft 10 and, in particular, relative to the annular segment 11, and relative to the conical rotor segment 12. In interaction with the inner shrouds 18, 20 and the radial walls 24, 26, the sealing ring 34 forms a hollow chamber 38 in the region of the front guide vane row 14 of the outlet diffuser 4 and an intervening chamber 40 in the region of the back guide vane row 16 of the outlet diffuser 4.

The sealing ring 34 can be one-piece or can also be composed of a plurality of sealing segments. It has a conical base body 42, which extends nearly parallel to the rotor segment 12 and has, at its end face, a radially outer-lying radial segment 44 and a radially inner-lying axial segment 46. The radial segment 44 delimits, by means of a hook segment 50 extending radially inward from the inner shroud ring 18, a sealing chamber 52, in which a seal 54, such as, for example, a W-shaped sheet metal seal, is inserted so as to prevent any main stream intake into the hollow chamber 38. The axial segment 46 is arranged in the region of sealing splines 56, 58 of the rotor segment 12 that extend essentially radially outward and, for interaction with the sealing splines 56, 68 or for radial inner sealing of the cavity 36, has a step-shape or tiered sealing element 60, such as a metallic honeycomb.

An axial intervening segment 62 extends downstream from the base body 42 between the radial segment 44 and the axial segment 46 and transitions into a radially outward oriented terminal segment 64. The intervening segment 62, the terminal segment 64, the radial wall 24, the inner shroud ring 18, the radial segment 44, as well as a top region of the base body 42, running between the intervening segment 62 and the radial segment 44, delimit the hollow chamber 38. The intervening chamber 40 is delimited by the curved wall 32, the inner shroud ring 20, the radial wall 26, the intervening segment 62, a bottom region of the base body 42, and the axial segment 46.

For reasons of clarity, the top region of the base body 42 between the radial segment 44 and the intervening segment 62 as well the bottom region of the base body 42 between the intervening segment 62 and the axial segment 46 are not identified by reference numbers. The terms "top" and "bottom" relate in this case to the orientation in FIG. 1.

For supply of cooling air 66 from the air distribution chamber 6 and thus from a region directly in front of the at least one combustion chamber onto the last row of rotating blades the compressor in this case or onto a region of the final compressor stage, the turbomachine 1 has a cooling device, which comprises a plurality of cooling air pipes 68.

The cooling air pipes 68 are spaced uniformly apart from one another in the peripheral direction of the turbomachine 1. They are preferably straight and run in the axial direction. Preferably, they have, in addition, an identically constant inner cross section. Obviously, they can have varying inner cross sections with respect to one another and/or individually. Obviously, they can also run at an angle to the axial direction, having at least one bend and/or varying inner diameter. They are each inserted into a pair of bores, composed of two bores 70, 72, which are aligned flush with respect to each other, with the front bore 70 passing through the radial wall 26 of the back guide vane row 16 and the back bore 72 passing through the curved wall 32 of the back guide vane row 16. As shown in the exemplary embodiment illustrated here, the back bore 72 can be designed like a connecting piece and thus be lengthened in the axial direction.

For axial positional securing of the cooling air pipes 68, each of them has a collar 74, with which they are arranged between the radial walls 24, 26 of the guide vane rows 14, 16. Corresponding recesses 76 are introduced in the radial wall 24 of the front guide vane row 14 for uptake of the respective collar 74. The cooling air pipes 68 thus bridge the intervening chamber 40 and make possible a targeted and oriented intake of cooling air form the air distribution chamber 6.

An inlet opening 78, aligned flush with the pair of bores and thus with the respective cooling air pipe 68, is introduced in the radial terminal segment 64 of the sealing ring 34 and a plurality of axial outlet openings 80 are introduced in the radial segment 44 of the sealing ring 34 and open directly into the cavity 36 for conveying the cooling air through the hollow chamber 38. In the exemplary embodiment shown here, the outlet openings 80 open opposite to the annular segment 11 into the cavity 36. The outlet openings 80 are preferably introduced in the peripheral direction and preferably are bores with a constant inner cross section. This inner cross section is smaller than the supplying cross section of the cooling air path, such as the inner cross sections of the cooling air pipes 68 and the inlet openings 78. The outlet openings 80 thus form a constriction, in spite of their constant inner cross section, as a result of which a nozzle effect is achieved, and the cooling air 66 that exits the outlet openings 80 is accelerated. An accelerated cooling air flow at lower relative speed to the rotor is achieved, which, in this case, effects an additional cooling. Obviously, the outlet openings 88 themselves can be designed as a nozzle by varying inner cross sections.

The cooling air 66 flows into the cooling air pipe 68, enters the hollow chamber 38 via the inlet openings 78, and leaves it via the outlet openings 80 into the cavity 36. In the process, a partial stream of cooling air flows along the annular segment 11 radially outward into the main stream conduit 22 and thus prevents any main stream intake into the cavity 36. This partial stream of air, flowing radially outward, thus acts effectively as air bleed. Another partial flow of the cooling air flows along the conical rotor segment 12 radially inward in the direction of the sealing splines 56, 58 or of the sealing element 60 and thus cools the rotor segment 12 and the sealing ring 34 or its base body 42.

In order to prevent mutual damage of the cooling air pipes and radial supply lines 82, such as, for example, air bleed lines or oil lines, traversing the intervening chamber 40, the cooling air pipes 68 and the supply line 82 are spaced apart from one another in the peripheral direction.

A turbomachine having a cooling device for supplying cooling air onto a compressor region from an air distribution chamber, is disclosed, the air distribution chamber being arranged between an outlet diffuser of a compressor and a combustion chamber, wherein the cooling device has cooling pipes for supplying cooling air from the air distribution chamber into a cavity between the outlet diffuser and a rotor segment of the compressor.

What is claimed is:

1. A turbomachine (1), comprising:
    a cooling device for supplying cooling air from an air distribution chamber (6) between an outlet diffuser (4) of a compressor (2) and at least one combustion chamber onto a compressor region, wherein the cooling device has cooling air pipes (68) for conveying cooling air through the cooling air pipes (68) from the air distribution chamber (6) into a cavity (36) between the outlet diffuser (4) and a rotor segment (11, 12) of the compressor (2) through an intervening chamber, wherein the cooling air pipes (68) have a first end connected to a wall delimiting a portion of the air distribution chamber (6) and a second end connected to a radial wall proximate to the cavity (36).

2. The turbomachine according to claim 1, wherein the cooling air pipes (68) are spaced apart from radial supply lines (82) in a peripheral direction of the turbomachine (1).

3. The turbomachine according to claim 1, wherein the cooling air pipes (68) are inserted in bores (70, 72) of the outlet diffuser (4).

4. The turbomachine according to claim 3, wherein the cooling air pipes (68) are each arranged with a collar (74) in a recess (76) between two radial walls (24, 26) of adjacent diffuser vane rows (14, 16).

5. The turbomachine according to claim 1, wherein the cooling air pipes (68) have an identical inner diameter along a length thereof and are distributed uniformly over a periphery of the outlet diffuser (4).

6. The turbomachine according to claim 1, wherein the cooling air pipes (68) open into a hollow chamber (38), which is delimited radially outward by the outlet diffuser (4) and opens via outlet openings (80) to the cavity (36).

7. The turbomachine according to claim 6, wherein the outlet openings (80) are arranged at an angle in a peripheral direction of the turbomachine (1).

8. The turbomachine according to claim 6, wherein the outlet openings (80) form a constriction for the cooling air (66).

9. The turbomachine according to claim 6, wherein the hollow chamber (38) is delimited radially inward by a sealing ring (42) mounted on the outlet diffuser (4).

10. A turbomachine (1), comprising:
    a cooling device for supplying cooling air from an air distribution chamber (6) between an outlet diffuser (4) of a compressor (2) and at least one combustion chamber onto a compressor region, wherein the cooling device has cooling air pipes (68) for conveying cooling air from the air distribution chamber (6) into a cavity (36) between the outlet diffuser (4) and a rotor segment (11, 12) of the compressor (2);
    wherein the cooling air pipes (68) are each arranged with a collar (74) in a recess (76) between two radial walls (24, 26) of adjacent diffuser vane rows (14, 16).

11. The turbomachine according to claim 10, wherein the cooling air pipes (68) are spaced apart from radial supply lines (82) in a peripheral direction of the turbomachine (1).

12. The turbomachine according to claim 10, wherein the cooling air pipes (68) are inserted in bores (70, 72) of the outlet diffuser (4).

13. The turbomachine according to claim 10, wherein the cooling air pipes (68) have an identical inner diameter along a length thereof and are distributed uniformly over a periphery of the outlet diffuser (4).

14. The turbomachine according to claim 10, wherein the cooling air pipes (68) open into a hollow chamber (38), which is delimited radially outward by the outlet diffuser (4) and opens via outlet openings (80) to the cavity (36).

15. The turbomachine according to claim 14, wherein the outlet openings (80) are arranged at an angle in a peripheral direction of the turbomachine (1).

16. The turbomachine according to claim 14, wherein the outlet openings (80) form a constriction for the cooling air (66).

17. The turbomachine according to claim 14, wherein the hollow chamber (38) is delimited radially inward by a sealing ring (42) mounted on the outlet diffuser (4).

18. A turbomachine (1), comprising:
    a cooling device for supplying cooling air from an air distribution chamber (6) between an outlet diffuser (4) of a compressor (2) and at least one combustion chamber onto a compressor region, wherein the cooling device has cooling air pipes (68) for conveying cooling air through the cooling air pipes (68) from the air distribution chamber (6) into a cavity (36) between the outlet diffuser (4) and a rotor segment (11, 12) of the compressor (2) through an intervening chamber;
    wherein the cooling air pipes (68) have an identical inner diameter along a length thereof and are distributed uniformly over a periphery of the outlet diffuser (4).

* * * * *